United States Patent
Sarup

(10) Patent No.: US 10,150,053 B2
(45) Date of Patent: *Dec. 11, 2018

(54) PROCESS FOR TREATING FATS AND OILS

(71) Applicant: Alfa Laval Corporate AB, Lund (SE)

(72) Inventor: Bent Sarup, Fredensborg (DK)

(73) Assignee: ALFA LAVAL CORPORATE AB, Lund (SE)

( * ) Notice: Subject to any disclaimer, the term of this patent is extended or adjusted under 35 U.S.C. 154(b) by 318 days.

This patent is subject to a terminal disclaimer.

(21) Appl. No.: 14/783,348

(22) PCT Filed: Mar. 25, 2014

(86) PCT No.: PCT/EP2014/055901
§ 371 (c)(1),
(2) Date: Oct. 8, 2015

(87) PCT Pub. No.: WO2014/170097
PCT Pub. Date: Oct. 23, 2014

(65) Prior Publication Data
US 2016/0060567 A1      Mar. 3, 2016

(30) Foreign Application Priority Data

Apr. 15, 2013   (EP) .................................... 13163784

(51) Int. Cl.
*B01D 5/00*      (2006.01)
*B01D 3/10*      (2006.01)
(Continued)

(52) U.S. Cl.
CPC .............. *B01D 5/006* (2013.01); *B01D 3/10* (2013.01); *B01D 3/143* (2013.01); *C11B 3/001* (2013.01);
(Continued)

(58) Field of Classification Search
CPC .. B01D 3/10; B01D 5/006; C11B 3/12; C11B 3/14
See application file for complete search history.

(56) References Cited

U.S. PATENT DOCUMENTS

| | | | |
|---|---|---|---|
| 5,658,433 A | 8/1997 | Baird | |
| 6,015,915 A | 1/2000 | Jamil et al. | |
| (Continued) | | | |

FOREIGN PATENT DOCUMENTS

| | | |
|---|---|---|
| CA | 2459351 A1 | 3/2003 |
| CN | 1649653 A | 8/2005 |
| (Continued) | | |

OTHER PUBLICATIONS

English translation of the Chinese Office Action and Search Report, dated Apr. 5, 2017, for Chinese Application No. 201480021172.5.
(Continued)

*Primary Examiner* — Renee Robinson
(74) *Attorney, Agent, or Firm* — Birch, Stewart, Kolasch & Birch, LLP

(57) ABSTRACT

Disclosed is a process for de-acidification of fats and oils, to obtain micronutrients, to obtain a fatty acid product, and recovery of refined oils, comprising: feeding pre-treated oil feed stream to a vacuum steam stripping section, stripping off volatile phases. Feeding the stripped off the volatile phases to a condensing stage providing a condensed phase and a vapour phase. Sending the condensed phase to a vacuum distillation operation and sending the vapour phase to a cold condensation stage. Subjecting the condensed phase to a vacuum distillation operation, and obtaining a high temperature distillate and a stream of volatiles. Feeding the vapour phase from the high temperature condensing stage along with the stream of volatiles from the vacuum distillation operation to the cold condensation stage obtaining a stream of non-condensable gases and a cold tempera- (Continued)

ture distillate, letting the stream of non-condensable gases continue to a vacuum system, and recovering from the vacuum steam stripping section a stream of refined oil.

21 Claims, 8 Drawing Sheets

(51) Int. Cl.
    *C11B 3/12*    (2006.01)
    *C11B 3/00*    (2006.01)
    *C11B 3/14*    (2006.01)
    *C11C 1/10*    (2006.01)
    *B01D 3/14*    (2006.01)

(52) U.S. Cl.
    CPC ............... *C11B 3/006* (2013.01); *C11B 3/12* (2013.01); *C11B 3/14* (2013.01); *C11C 1/106* (2013.01)

(56) References Cited

U.S. PATENT DOCUMENTS

| | | | |
|---|---|---|---|
| 6,750,359 | B1 | 6/2004 | Copeland et al. |
| 2004/0030166 | A1 | 2/2004 | Copeland et al. |
| 2004/0253353 | A1* | 12/2004 | Copeland ............ C11B 3/00 426/417 |
| 2011/0220483 | A1 | 9/2011 | Margnat et al. |

FOREIGN PATENT DOCUMENTS

| | | |
|---|---|---|
| CN | 102089263 A | 6/2011 |
| DE | 196 52 522 A1 | 6/1998 |
| EP | 2 597 142 A1 | 5/2000 |
| EP | 2 684 944 A1 | 1/2014 |
| RU | 2122013 C1 | 11/1998 |
| WO | WO 00/49116 A1 | 8/2000 |
| WO | WO 03/020860 A2 | 3/2003 |
| WO | WO 03/080778 A2 | 10/2003 |

OTHER PUBLICATIONS

Mingtao et al, "Research overview on extraction of tocopherol from distillates of oil deodorization," Jour. of Northwest Sci-Tech Univ. of Agri. and For. (Nat. Sci. Ed.), vol. 30, Sep. 30, 2002, pp. 74-76 (Total pp. 4).

Russian Decision on Grant, dated May 25, 2017, for corresponding Russian Application No. 2015148759.

International Search Report, issued in PCT/EP2014/055901, dated Sep. 9, 2014.

Search Report issued in European priority application 13163784.5, dated Sep. 23, 2013.

Written Opinion of the International Searching Authority, issued in PCT/EP2014/055901, dated Sep. 9, 2014.

* cited by examiner

PROCESS FOR TREATING FATS AND OILS

The present invention relates to a process for de-acidification of fats and oils, to obtain micronutrients, to obtain a fatty acid product, and recovery of refined oils.

BACKGROUND

Most edible oils go through refining operations comprising pretreatment steps known as degumming and/or neutralisation, most often followed by treatment with a solid adsorbent, e.g. acid activated clay, known as bleaching. Pretreatment of oils for non-edible use, such as manufacture of biodiesel, may or may not include the bleaching operation. The pretreated oil is subsequently subjected to a high temperature operation known as deodorization. Deodorisation is conducted under vacuum and consists in general of two main process steps, a "heat bleaching" step, typically conducted within a range from about 240 to about 270° C. within a range of about 0.5 to about 1.5 hrs retention time and a second step consisting of stripping of volatiles by the use of steam. These steps may occur simultaneously or sequentially. Pretreatment of oil for non-edible use such as biodiesel manufacture does normally not include the heat bleaching step. Steam stripping, also known as de-acidification, of fats and oils, comprises reduction of the content of free fatty acid (FFA) and other volatiles by stripping with steam under vacuum. Volatiles are mainly those present in the pretreated oil, but volatiles may also be formed during the deodorisation operation, e.g. at the heat bleaching step. Steam stripping of volatile components may take place before, during or after the heat bleaching step, in any combination of those possibilities.

In recent years some refiners has in their deodorization sections included an additional condensation stage an arrangement often referred to as "double scrubbers" disclosed in U.S. Pat. No. 6,750,359, having an additional scrubber at high temperature. While use of this "double scrubber" enables withdrawal of a side-stream of condensate from the high temperature condensation step enriched in micronutrients, there remains a significant loss of micronutrients in the FFA rich overhead stream. A further significant limitation of such approach is that the separation efficiency in the hot scrubber is closely linked to the operating conditions of the deodorizer, where the main function is to produce edible oil by stripping steam under vacuum. Such linkage will impose rather low limits for the obtainable enrichment for the micronutrients in any distillate stream withdrawn from the hot scrubber. Other processes according to the prior art are disclosed by U.S. Pat. No. 7,598,407 and US2010/0200805. One example of deodorisation conducted by steam stripping in combination with heat bleaching is disclosed by WO 98/00484. Developments and improvements concerning deodorizations are disclosed in an article published at the Proceedings of the World Conference on Palm and Coconut Oils for the 21$^{st}$ Century, p. 67ff (1999) having the title "Recent Developments and Improvements in Palm Oils Stripping and Fatty Acid Destillation" by the author Peter Fassler.

Simultaneously with the removal of FFA, the steam stripping action will also partly remove valuable components such as micronutrients including tocopherols, sterols, squalene as well as "neutral oils", i.e. tri-, di- and mono-acylglycerides (TAG, DAG, MAG), which represents a loss of valuable main product. Volatiles are condensed in a cold condensation stage, before the stripping steam along with non-condensable gases (e.g. inleakage air) are being lead to the vacuum system. Such a cold condensation stage commonly operates within a range from about 40 to about 60° C. and is commonly implemented as a scrubber loop, where cold distillate is used to condense the volatiles. The cold distillate will, besides the FFA:s, also contain micronutrients and "neutral oils". Due to the high value of the micronutrients there is particular interest in recovering those from the distillate. However, the micronutrients need to be enriched in their concentration in the plant so that their further processing in purification plants and transport to such plants can take place in an economical manner. The loss of "neutral oils" will further dilute any enriched stream of micronutrients that can be withdrawn from the system.

A current trend in the edible oil industry is to use certain enzymes, commonly known as phospholipase A ("PLA") type enzymes, to enable removal of phosphorous containing components ("phospholipids") of the crude edible oil down to very low ppm levels, acting by producing more water-soluble lysophospholipids by splitting off a fatty acid from the phospholipid. However, a side effect of this process is increased production of FFA, which will dilute the micronutrients in the deodorizer distillates. Another type of enzymes commonly known as phospholipase C ("PLC") type enzymes have also recently been taken into large scale industrial use. These enzymes give increased yields of oil-product by converting phospholipids to DAG. However, the increased level of DAG in the oils tends to aggravate the problem with neutral oils loss during the steam stripping operation since the vapour pressure of DAG is higher than the vapour pressure of TAG.

When pretreating biodiesel it is of interest to apply high severity conditions i.e. high stripping temperature for instance within the range 265 to 275° C., high amount of stripping steam for instance within the range 1 to 2% relative to the amount of oil feed, and deep vacuum for instance within the range 1.5 to 2 mbar in order to recover as much of the micronutrients as possible. However, such high severity conditions will also lead to increased losses of neutral oil, which, besides being a value loss, also will tend to dilute micronutrients.

THE INVENTION

Accordingly the present invention provides a solution to the above mentioned problems by the new process for acidification of fats and oils.

The present invention relates to a process for de-acidification of fats and oils, to obtain micronutrients, to obtain a fatty acid product, and recovery of refined oils, which process comprises process steps (i) to (v).

Step (i) comprises feeding a stream of pre-treated oil to a vacuum steam stripping section, stripping off volatile phases, optionally assisting the stripping off volatile phases by addition of stripping steam and unintentional in-leakage of air. Step (ii) comprises feeding the stripped off volatile phases to a high temperature condensing stage or to a combination of a high temperature condensing stage and a medium temperature condensing stage. A condensed phase and a vapour phase are obtained. The condensed phase is sent to a vacuum distillation operation, and the vapour phase is sent to a cold condensation stage. Step (iii) comprises transferring the condensed phase to a distillation stage for subjecting the condensed phase to a vacuum distillation operation, and obtaining a high temperature distillate and a stream of volatiles. Step (iv) comprises feeding the vapour phase from the high temperature condensing stage or the vapour phase from the combination of a high temperature condensing stage and the medium temperature condensing stage, along with the stream of volatiles from the vacuum distillation operation to the cold condensation stage. A stream of non-condensable gases and a cold temperature distillate from the cold condensation stage are obtained. The stream of non-condensable gases is lead to continue to a vacuum system. Step (v) comprises recovering from the vacuum steam stripping section a stream of refined oils.

The process may also comprise adding a side stream of cold temperature distillate to the vacuum distillation operation.

The process may also comprise assisting the vacuum distillation operation with stripping steam.

The process according one embodiment of the invention may comprise that process step (ii) is carried out in a combination of a high temperature condensing stage and a medium temperature condensing stage, and that the process also comprises retaining and sending all or some portion of a condensed oils from the high temperature condensing stage along with the pre-treated oil feed stream directly to the feed point of the vacuum steam stripping section or indirectly via a pre-treatment step.

The process according another embodiment of the invention may comprise that the stripped off volatile phases from the vacuum steam stripping section are first fed to a high temperature condensing stage, obtaining a condensed phase and a vapour phase. The condensed phase may be sent to a vacuum distillation stage for vacuum distillation operation, and the vapour phase may be sent to a cold condensation stage. Obtaining in the vacuum distillation stage a stream of volatiles, which stream of volatiles may be transferred along with the vapour phase to the cold temperature stage.

The process according to a further embodiment of the invention may also comprises that the stripped off volatile phases from the vacuum steam stripping section are first fed to a high temperature condensing stage and then to a medium temperature condensing stage. The process also comprises that a condensed phase and a vapour phase are obtained in the medium temperature condensing stage. The condensed phase may be sent to a vacuum distillation stage for vacuum distillation operation, and the vapour phase may be sent to a cold condensation stage, obtaining in the vacuum distillation stage a stream of volatiles. The stream of volatiles may be transferred along with vapour phase to the cold temperature stage.

The process according to the invention may also comprise subjecting the condensed phase to a to a vacuum distillation stage for vacuum distillation operation along with a side stream of cold temperature distillate. The distillation may be assisted with stripping steam and obtaining a high temperature distillate and a stream of volatiles. The stream of volatiles may be transferred along with vapour phase to the cold temperature stage.

The process according to the invention the stream of volatiles along with vapour phase may be transferred to the cold temperature stage. A stream of non-condensable gases is obtained, which stream of non-condensable gases may be sent to vacuum system. A cold temperature distillate may also be obtained and the cold temperature distillate may be a fatty acid product stream.

In the process the high temperature distillate may be a stream enriched in micronutrients such as tocopherols, sterols, and squalene, and the stream of refined oil may contain tri-, di- and mono-acylglycerides.

In the process the vacuum steam stripping section in step (i) may be operating at pressure within the range from 1 to 10 mbar, preferably within a range from 1.5 to 5 mbar vacuum level.

In the process the temperature in the high temperature condensing stage may be within the range from 130 to 220° C. preferably within the range from 130 to 170° C., more preferably within the range from 140 to 150° C.

In the process the distilling unit may be working according to counter-current principle which comprises a stripping section and a rectification section and operates at a vacuum level within the range 1 to 5 mbar, and temperature within the range 240 to 260° C.

In the process the temperature in the medium temperature condensing stage may be within the range 130 to 170° C., preferably within the range 140 to 150° C.

In the process step (i) may comprise feeding an oily feed stream (1) comprising volatiles such as free fatty acids, micronutrients and neutral oils such as mixtures of tri-, di- and mono-acylglycerides, to a vacuum steam stripping section, and process step (i) comprises also stripping off fatty acids together with other volatiles, and neutral oils.

The process according to the invention may have any combinations of the above mentioned alternatives, and is thus not limited to anyone of the mentioned alternatives. Further aspects and embodiments of the invention are defined by the sub-claims. The invention will be further be illustrated by the accompanying drawings and be presented in the following detailed description of embodiments of the invention. The invention will also be illustrated by the following examples. The below figures and examples are intended to illustrate the invention not to limiting the scope of invention. If not otherwise stated in the examples and tables the percentage is given by percent by weight (wt %).

DETAILED DESCRIPTION OF THE DRAWINGS

Figure 1:
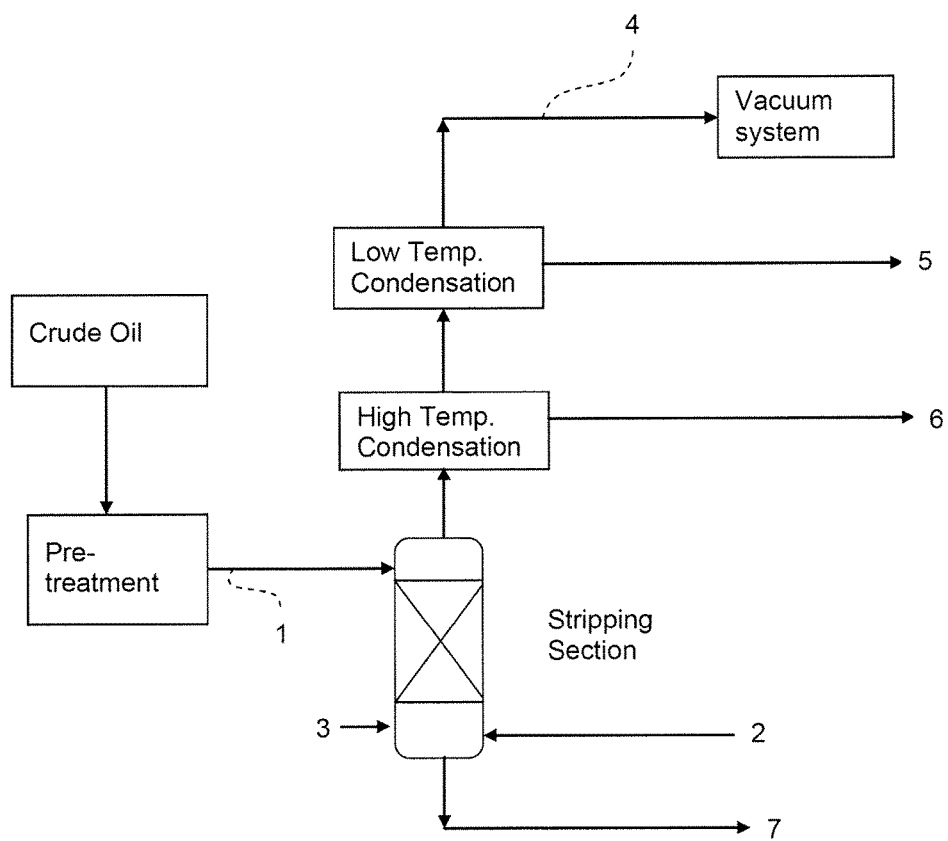
FIG. 1 is showing a simplified flow diagram of the prior art.

FIG. 1 illustrates one embodiment of prior art in a simplified flow diagram in which an oily feed stream 1 is fed to a vacuum steam stripping section together with stripping steam 2 and in-leakage of air 3. Fatty acids, micronutrients together with other volatiles, and neutral oils are stripped off and transferred to a high temperature condensing stage. At the high temperature condensing stage a stream enriched in micronutrients 6 is condensed and separated off from the feed. The remaining volatiles not condensed in the high temperature condensation stage is further transferred to a cold condensation stage, producing a fatty acid product stream 5 which is condensed, and a stream 4 of steam, non-condensable gases along with traces of fatty acids and other lighter hydrocarbons vapors, allowing stream 4 to continue to vacuum system. From the vacuum steam stripping section a product of refined, neutral oil stream 7 is recovered.

Figure 2:
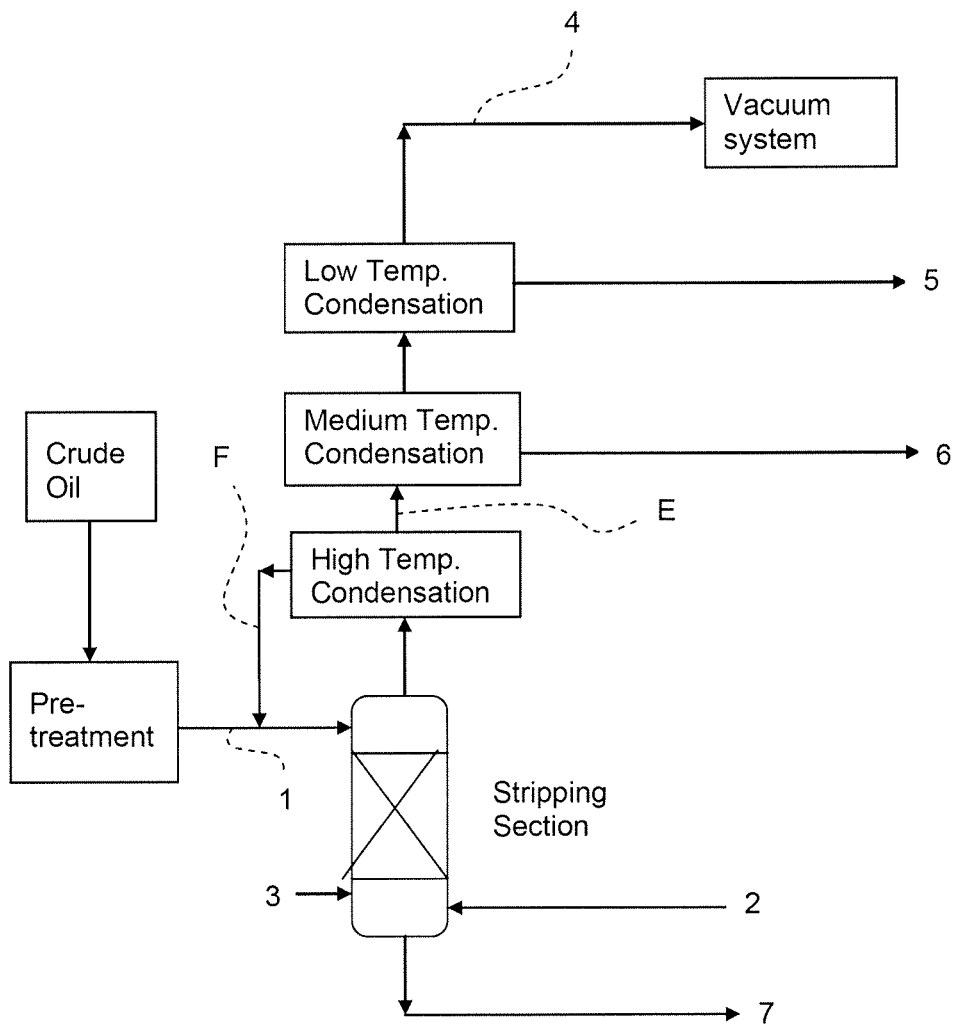
FIG. 2 is showing another simplified flow diagram of the prior art.

FIG. 2 discloses another prior art process for treating vegetable oils and/or animal fats in another simplified flow diagram, according to this flow diagram the process also comprises a neutral oil recovery stage. A medium temperature condensation stage is placed between the high temperature condensation stage and the low temperature condensation stage. FIG. 2 is showing that an oily, pretreated feed stream 1 is fed to a vacuum steam stripping column together with stripping steam 2 and in-leakage of air 3. In the vacuum steam stripping column fatty acids, micronutrients together with other volatiles and neutral oils are stripped off and transferred to a high temperature condensing stage. At the high temperature condensing stage the neutral oils are condensed from the vapour phase. A stream of vapor phase E containing micronutrients, fatty acids, residues of neutral oils and other volatiles is sent to the medium temperature condensation stage for further processing. All or some portion of the condensed oils F are retained from the high temperature condensation stage, and are sent along with the pre-treated oil feed stream 1 directly to the feed point of the vacuum steam stripping section (stripping column) or indirectly via one or more pre-treatment steps, such as upstream operations, i.e. to a bleaching operation stage and/or to degumming/neutralisation operation stage. From the vacuum steam stripping column a refined, neutral oil stream 7 recovered as a product.

Figure 3:
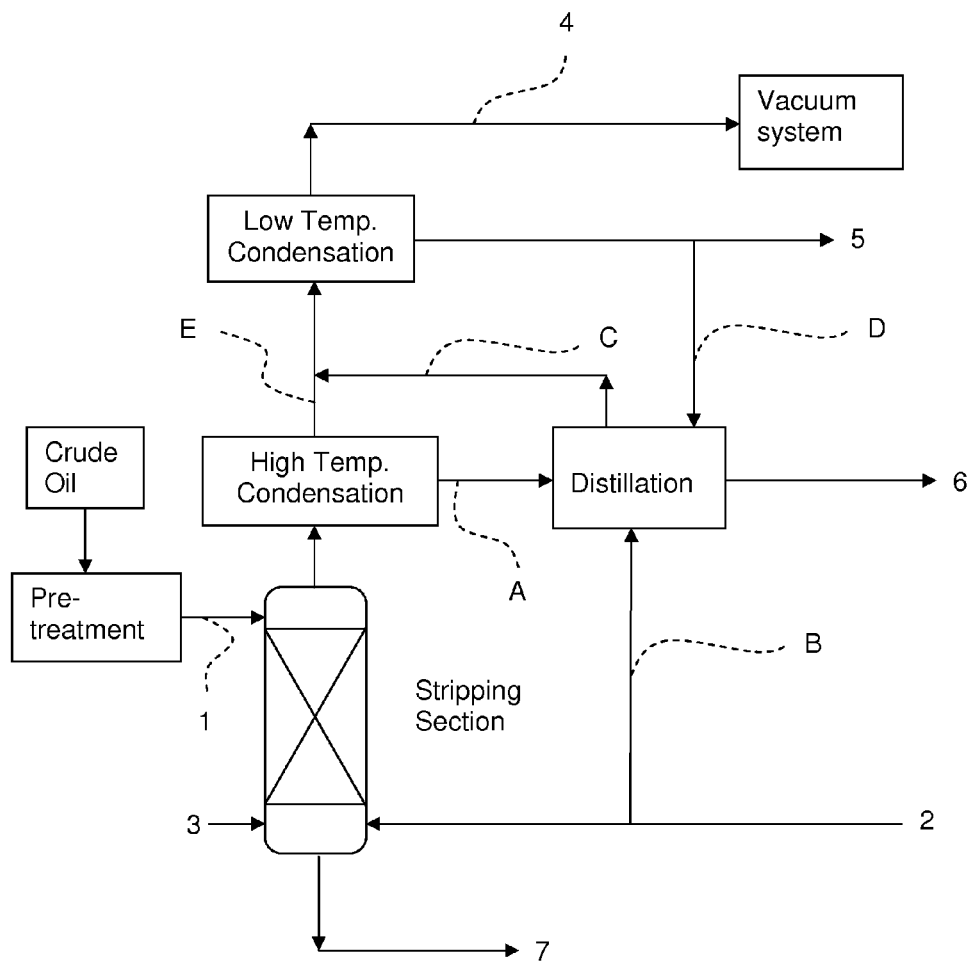
FIG. 3 is showing a sketch of the present invention according to one embodiment, see Example 2.

FIG. 3 is showing a simplified flow diagram of the present invention. According to the invention a feed stream of pre-treated oil 1 is fed to the vacuum stripping column. The oily, pretreated feed stream 1, containing among other components free fatty acids and micronutrients, is fed to a vacuum steam stripping column together with stripping steam 2 and in-leakage of air 3. The feed stream is fed to a stripping column which operates in a vacuum level within a range from 1 to 10 mbar, preferably within a range 1.5 to 5 mbar. Fatty acids are stripped off in the vacuum stripping column together with other volatiles such as some of the micronutrients, some "neutral oil", i.e. mixtures of tri-, di- and mono-acylglycerides. Steam along with volatile components is transferred to a high temperature condensation stage. At the high temperature condensation stage the least volatile fraction is condensed at elevated temperature. The temperature in the high temperature condensation stage is suitably within the range 130 to 170° C., preferably within the range 140 to 150° C., to condense the majority of the micronutrients, i.e. tocopherols, sterols etc., and neutral oil along with some free fatty acids from the vapour phase. The condensation stage may be implemented in a number of well-known ways such as scrubbing with condensate or another colder oily stream, i.e. pre-treated oil or stripped oil, simply using a low pressure drop indirect condenser. The remaining volatiles not condensed in the high temperature condensation stage, i.e. the vapour phase E, are further transferred to a cold condensation stage.

The high temperature condensate stream A is fed to a distillation unit, which optionally can use steam B to assist the separation. The distillation unit separates free fatty acids and other volatiles with similar elevated vapour pressures from micronutrients and some neutral oils with lower vapor pressures. These volatiles are led, optionally along with steam, to the low temperature condensation stage as stream of volatiles C along with vapor phase E. The bottoms product from the distillation unit, i.e. the high temperature condensate steam 6 is enriched with micronutrients. Optionally the condensation in the overhead system of the distillation column can be realized using a small side stream D of the low temperature distillate 5, but it is also possible to use a conventional separate overhead condenser which is not shown in FIG. 3.

The distillation unit can be implemented in a number of well-known ways including short path distillation and counter-current multistage columns. According to the invention the counter-current principle may be used, which counter-current principle comprises a stripping- and a rectification section. The stripping- and rectification sections may operate at a vacuum level typical for deodorizer sections, i.e. within the range 1 to 5 mbar, and temperatures typically used for steam stripping in deodorizers, i.e. within the range 240 to 260° C.

In this way the invention provides that micronutrients can be retained in the distillate during the high temperature condensation stage while the distilling unit removes co-condensed free fatty acids, which FFAs otherwise would dilute the micronutrients to a degree that the commercial usefulness is lost.

Figure 4:
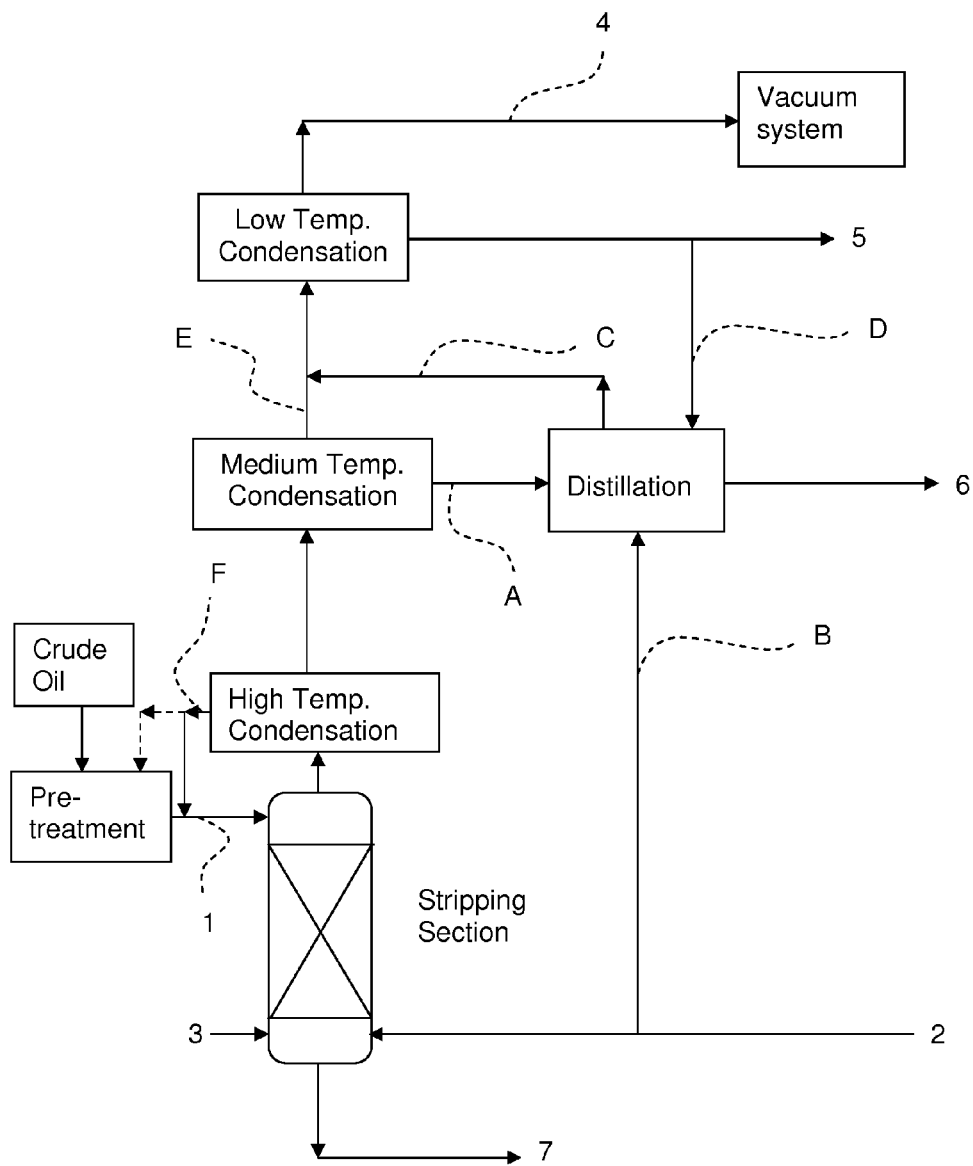
FIG. 4 is showing a sketch of the present invention according to another embodiment, see Example 3.

FIG. 4 is showing a simplified flow diagram of the present invention according to another embodiment. According to this embodiment the invention also provides improved neutral oil recovery 7. The figure is showing that an oily, pretreated feed stream 1 is fed to a vacuum steam stripping column together with stripping steam 2 and in-leakage of air 3. In the vacuum steam stripping column fatty acids, micronutrients together with other volatiles and neutral oils are stripped off and transferred to a high temperature condensing stage. At the high temperature condensing stage the neutral oils are condensed from the vapour phase. All or some portion of the condensed oils F are retained from the high temperature condensation stage, and are sent along with the pre-treated oil feed stream 1 directly to the feed point of the vacuum steam stripping section (stripping column) or indirectly via one or more pre-treatment steps, such as upstream operations, i.e. to a bleaching operation stage and/or to degumming/neutralisation operation stage. From the vacuum steam stripping column a neutral oil stream 7 is collected as a product.

From the high temperature condensing stage the vapour phase is transferred to the medium temperature condensing stage. According to the present invention the medium temperature condensation stage is placed between the high temperature condensation stage and the low temperature condensation stage. At the medium temperature condensing stage the vapour phase is separated into a medium temperature condensate and a less volatile fraction. The least volatile fraction of the vapour phase is condensed at elevated temperature. To condense the majority of the micronutrients, i.e. tocopherols, sterols etc., and neutral oil along with some free fatty acids from the vapour phase the temperature in the medium temperature condensation stage is suitably within the range 130 to 170° C., preferably within the range 140 to 150° C. The condensation stage may be implemented in a number of well-known ways such as scrubbing with condensate or another colder oily stream, i.e. pre-treated oil or stripped oil, simply using a low pressure drop indirect condenser. The remaining volatiles not condensed in the medium temperature condensation stage are further transferred to the cold condensation stage.

From the medium temperature condensate a stream A is fed to a distillation unit, which optionally can use steam B to assist the separation. The distillation unit separates free fatty acids and other volatiles with similar vapour pressures from micronutrients and some neutral oils with lower vapor pressures. These volatiles are led, optionally along with steam, to the low temperature condensation stage as a stream of volatiles C along with the volatiles not condensed in the medium temperature condensing stage, i.e. vapour phase E. The bottoms product from the distilling unit, i.e. the high temperature condensate steam 6 is enriched with micronutrients. Optionally the condensation in the overhead system of the distillation column can be realized using a small side stream D of the low temperature distillate 5, but it is also possible to use a conventional separate overhead condenser this is not shown in FIG. 4.

The present invention shows a significant difference to the prior art, in that the condensate from the high temperature condensation stage (as in FIG. 3) or the medium temperature condensation stage (as in FIG. 4) is not taken out as a product stream. Instead the condensate according to the present invention is subjected to a distillation operation. In the distillation operation the high temperature condensate is separated into volatiles fraction mainly consisting of fatty acids, and as condensate product steam enriched in micronutrients and also containing some neutral oil, mainly consisting of TAG and DAG. Optionally, stripping steam may be added to the distillation operation to enhance the removal of free fatty acids from the high (medium) temperature condensate.

The low temperature condensation stage may be implemented by a number of well-known processes, such as scrubbing the gas with cold condensate or with indirect heat exchange via a surface cooler. The cold temperature condensation stage produces a low temperature condensate.

EXAMPLES

Example 1 U.S. Pat. No. 6,750,359

This comparative test was performed according to the simplified flow diagram in FIG. 1 and the mass balance shown below in Table 1. The mass balance represents a 1,200 ton oil/day processing case, typical for a case of so called "physical refining", where free fatty acids are removed from the oil by stripping using steam under vacuum. The oil composition used is typical for soybean oil. In Example 1 the oil is fed to the stripper column at 260° C. and 1% stripping steam relative the amount of pre-treated oils applied for stripping. The high temperature condensation takes place at 160° C. and low temperature condensation at 55° C., in both cases taking place by scrubbing the vapours with an oily condensate generated from the vapours at those temperature levels. The vacuum level at the top of the cold condensation stage was in this example set at 2.5 mbar. The mass balance was established using a process simulator (PRO/II version 9.1 from SimSci-Esscor) combined with a proprietary Alfa Laval property database for lipids. The results are shown in Table 1.

TABLE 1

| | Stream No. | | | | | | |
|---|---|---|---|---|---|---|---|
| | 1 | 2 | 3 | 4 | 5 | 6 | 7 |
| Stream Name | Pretreat. Oil | Steam | Inleak. Air | Non-cond. | Low Temp. Dist. | High Temp. Dist. | Stripped Oil |
| Flow [kg/hr] | 50000.0 | 500.0 | 10.0 | 516.1 | 496.8 | 95.5 | 49401.6 |
| Composition [wt %] | | | | | | | |
| TAG | 97.1775 | — | — | — | 0.0001 | 14.1499 | 98.3272 |
| DAG | 1.0000 | — | — | — | 0.0205 | 16.9213 | 0.9792 |
| MAG | 0.0500 | — | — | 0.0001 | 2.5460 | 5.8072 | 0.0137 |
| FFA | 1.0000 | — | — | 0.0307 | 95.8199 | 23.1861 | 0.0035 |
| Tocopherols | 0.1200 | — | — | — | 0.3697 | 17.3617 | 0.0842 |
| Sterols | 0.6000 | — | — | 0.0001 | 1.0089 | 21.9542 | 0.5546 |
| Squalene | 0.0025 | — | — | — | 0.0538 | 0.6146 | 0.0008 |
| Water | 0.0500 | 100.00 | — | 98.0316 | 0.1810 | 0.0051 | 0.0367 |
| Air | — | — | 100.00 | 1.9376 | — | — | — |
| Σ | 100.00 | 100.00 | 100.00 | 100.00 | 100.00 | 100.00 | 100.00 |

One of the main objectives of the high temperature condensation stage is to enable withdrawal of a side stream enriched in micronutrients, specifically tocopherols, or tocotrienols in case of palm oil. Tocopherols in enriched streams, for instance within the range 8 to 20% tocopherols, are today valued at about 35,000 USD/ton vs. about 1,000 USD/ton for the oil. Therefore, there is a considerable commercial value in maximum recovery of tocopherols in enriched streams of deodorizer distillates. Naturally the value of tocopherols will increase as the concentration increases, since transportation costs to a micronutrient plant decreases, and free fatty acids (FFA) can be sold as such rather than being a waste product in a micronutrient processing plant, i.e. ending up as soap. However, the mass balance in Table 1 displays a significant drawback of the prior art, i.e. the low temperature condensate has a tocopherol concentration of 0.37% and 10% of the tocopherol in volatiles being stripped off with the oil, and therefore the tocopherols being lost to the low temperature distillate. Such according to the invention at 140° C. in the high temperature condensation stage is summarized in Table 3, see below, total mass balance 0.014 kg/hr.

TABLE 2

| Stream Name | Oil in | Steam | Inleak. Air | To vacuum | Hot Dist. | Cold Dist. | After Strip. |
|---|---|---|---|---|---|---|---|
| Flow [kg/hr] | 50000.0 | 500.0 | 10.0 | 516.4 | 283.6 | 309.3 | 49400.7 |
| TAG | 97.1775 | — | — | — | 4.8154 | — | 98.3287 |
| DAG | 1.0000 | — | — | — | 5.7908 | 0.0011 | 0.9789 |
| MAG | 0.0500 | — | — | — | 5.6060 | 0.7787 | 0.0135 |
| FFA | 1.0000 | — | — | 0.0314 | 67.8128 | 98.8937 | 0.0034 |
| Tocopherols | 0.1200 | — | — | — | 6.5294 | 0.0237 | 0.0838 |
| Sterols | 0.6000 | — | — | — | 9.1391 | 0.1104 | 0.5541 |
| Squalene | 0.0025 | — | — | — | 0.2978 | 0.0051 | 0.0008 |
| Water | 0.0500 | 100.00 | — | 98.0322 | 0.0087 | — | — |
| Air | — | — | 100.00 | 1.9364 | — | — | — |
| Σ | 100.00 | 100.00 | 100.00 | 100.00 | 100.00 | 100.00 | 100.00 | drawback will become even more pronounced with the application of so called PLA enzymes in pre-treatment, which can bring the FFA content in the pre-treated oil within the range 1.2 to 1.5%.

Figure 5:
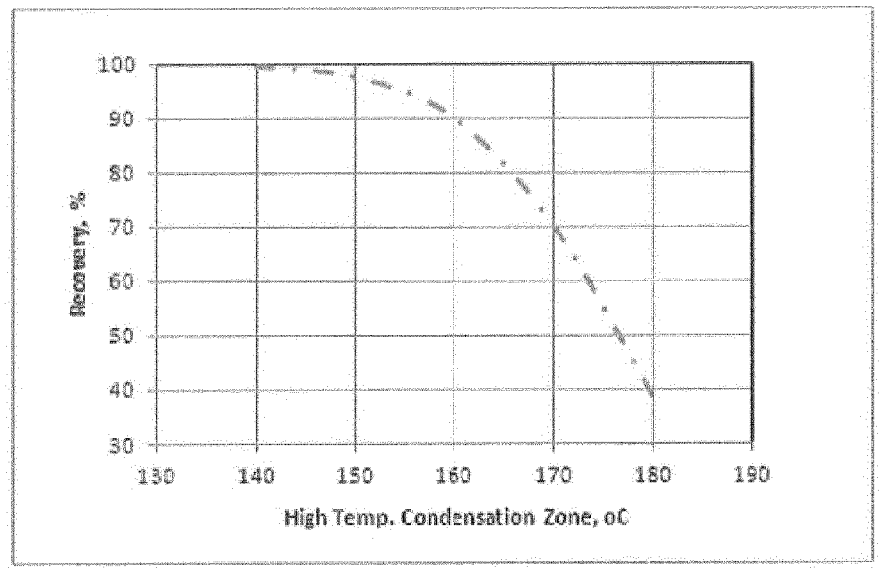
FIG. 5 is showing a graph of tocopherol recovery as function of condensation temperature for a prior art plant according to Example 1.
Figure 6:
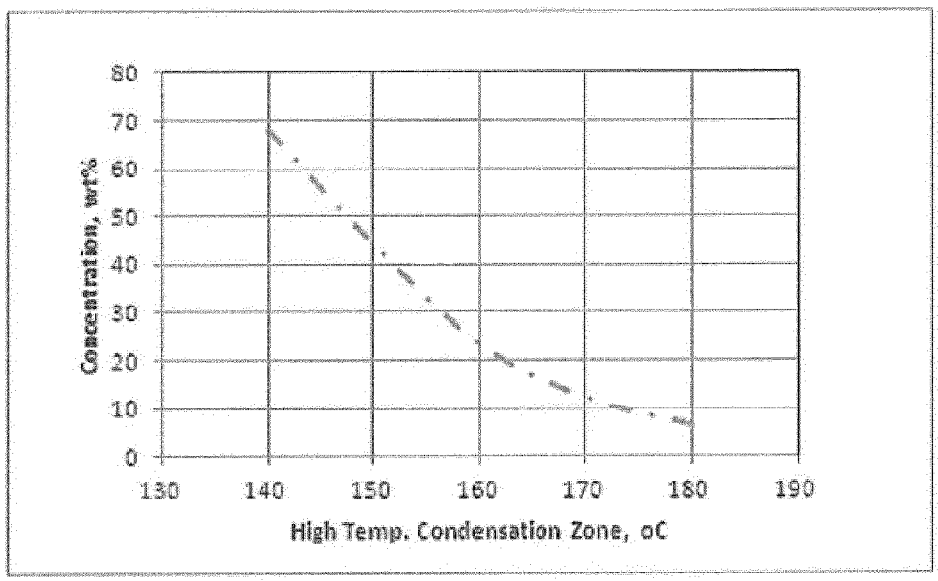
FIG. 6 is showing a graph of FFA in high temperature distillate for a prior art plant according to Example 1.
Figure 7:
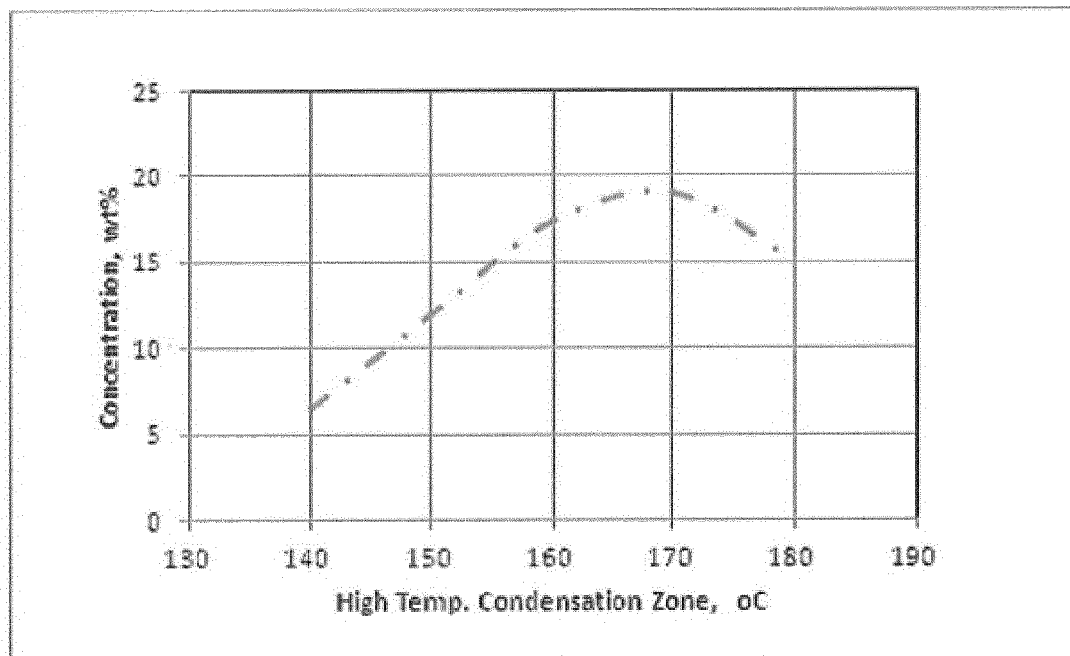
FIG. 7 is showing a graph of tocopherol concentration in high temperature distillate for a prior art plant according to Example 1.

A detailed characteristics of the drawback of the process according to the prior art according to FIG. 1 can be described by the performance at various temperatures of the high temperature condensation stage as shown in the graphs of FIGS. 5, 6 and 7. With the purpose of maximizing tocopherol recovery the temperature in the high temperature condensation stage should be lowered and the recovery then approaches 100%, e.g. 140° C., see FIG. 5. However, at the same time FFA begins to condense along with the tocopherol, see FIG. 6, to the extent that the concentration of tocopherols falls below a lower concentration limit for example within a range 8 to 10%, where it is feasible to transport the enriched tocopherol stream for further processing, see FIG. 7.

Figure 8:
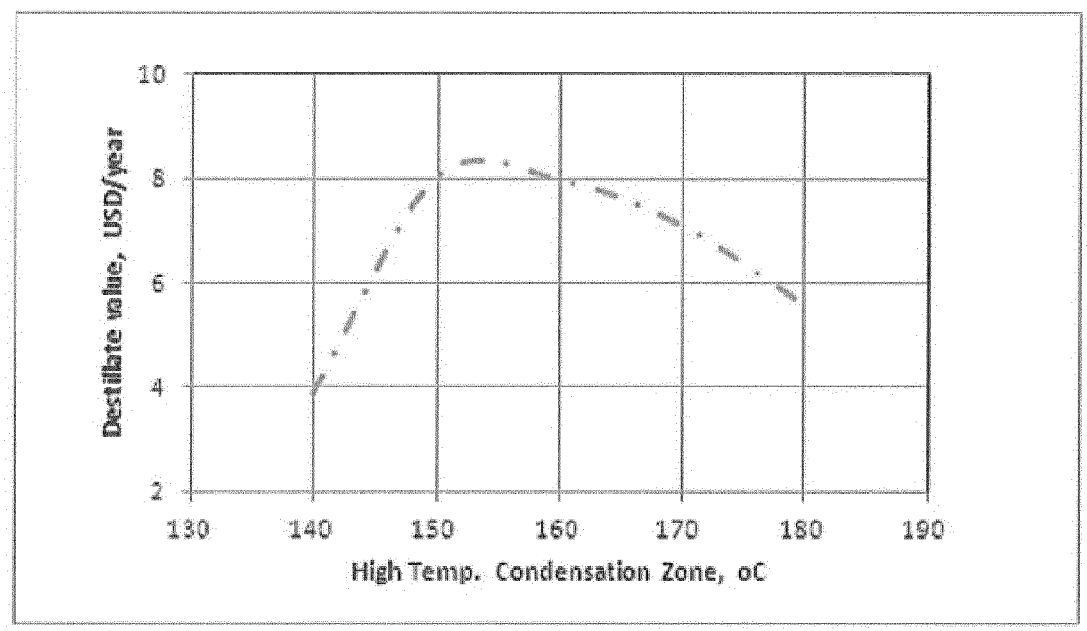
FIG. 8 is showing a graph of value of distillate, 1200 ton/day and 340 operating days/year, for a prior art plant according to Example 1.

To illustrate the economic impact of this, assume that the low temperature, i.e. the FFA rich distillate, is valued at 800 USD/ton and the enriched tocopherol stream is valued at 35,000 USD/ton (calculated on pure tocopherol basis, when tocopherol concentration is above 8%, otherwise set at low price). FIG. 8 then shows the economic effect of dilute tocopherol stream at high tocopherol recovery at around 140° C., and of course at higher temperatures when tocopherol is lost to the low temperature condensate and degraded FFA value.

Example 2, Comparative U.S. Pat. No. 6,750,359

The process in FIG. 1 and FIG. 3 were simulated and their mass balances compared at a temperature of 140° C. in the high temperature condensation stage. The distillation column was simulated with 4 stages and a bottom reboiler. 10 kg/hr of steam, corresponding to 3.5% of the condensate being fed to the distilling column) was used to assist stripping off the fatty acids. The reboiler was operated at 260° C. and the vacuum level in the top of the distilling column 3.2 mbar. 100 kg/hr of low temperature distillate was used as reflux for rectification section of the column. The feed stage was arranged such that the column had two stages for rectification and two stages for stripping.

The mass balance according to prior art at 140° C. in the high temperature condensation stage is summarized in Table 2, total mass balance 0.005 kg/hr, and the mass balance according to the invention at 140° C. in the high temperature condensation stage is summarized in Table 3, see below, total mass balance 0.014 kg/hr.

The mass balances clearly show how the invention enables reduction of FFA in the high temperature distillate from 67.8% to 0.15%, thus bringing the tocopherol concentration from 6.5% to 21.4%.

Figure 9:
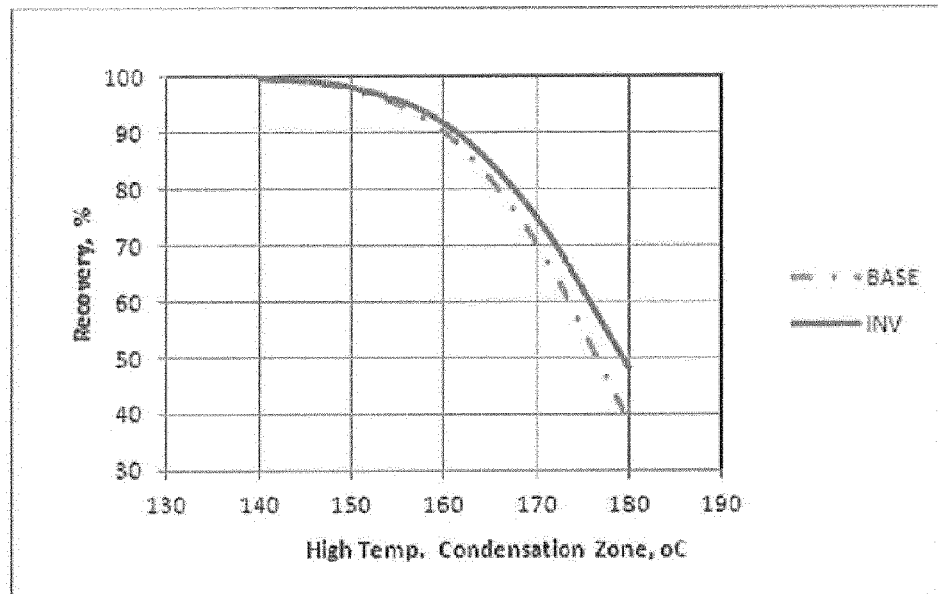
FIG. 9 is showing comparative graphs of tocopherol recoveries as function of condensation temperature according to Example 2.
Figure 10:
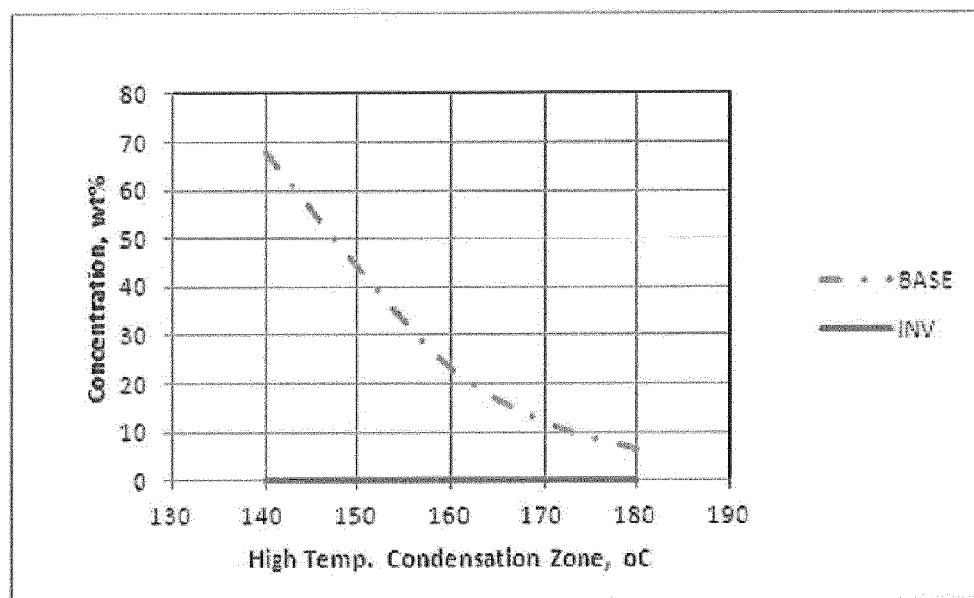
FIG. 10 is showing comparative graphs of FFA in high temperature distillate according to Example 2.
Figure 11:
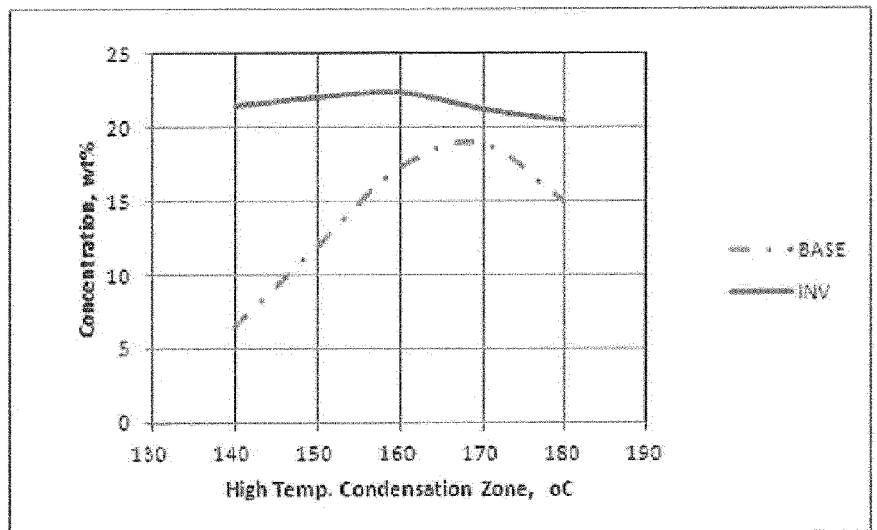
FIG. 11 is showing comparative graphs of tocopherol concentration in high temperature distillate according to Example 2.

Comparison of the prior art with the invention over a broader range of temperatures is shown in FIGS. 9, 10, and 11, BASE represent prior art and INV the invention. The consistently low FFA concentration in the high temperature distillate is evident, as is the resulting consistently higher tocopherol concentration.

Figure 12:
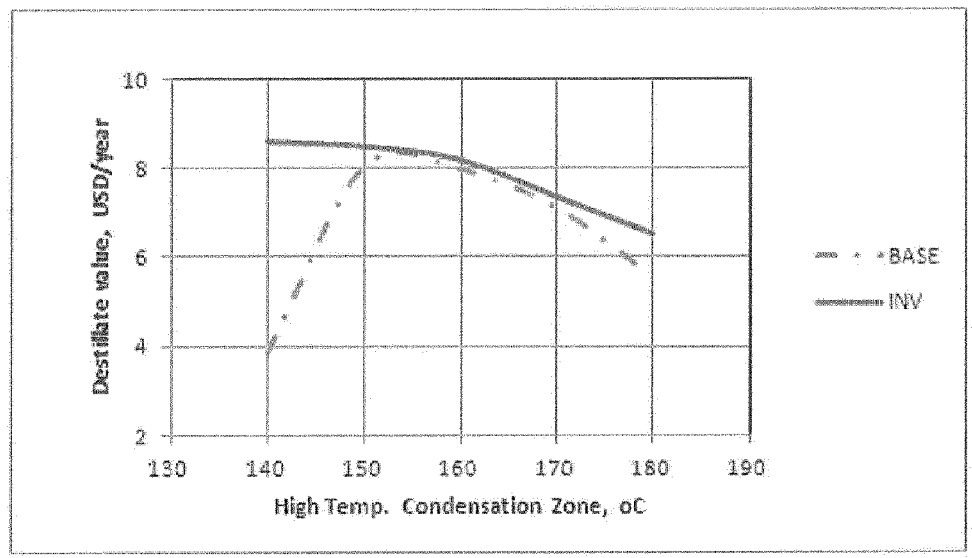
FIG. 12 is showing comparative graphs of value of distillate, 1200 ton/day and 340 operating days/year according to Example 2.

As in Example 1, an economic evaluation of the distillate value can be made over a range of temperatures in the high temperature condensation stage, the result of which is displayed in FIG. 12.

As expected the value increases using the invention at lower temperatures in the high temperature condensation stage at about 140° C. ensuring close to quantitative capture of the tocopherols. The maximum for prior art is more theoretical than practical, since it in plant operation with changing feed stocks will be very difficult to ensure operation in this relatively narrow optimum interval. So in this Example the annual advantage using the invention is around 1 mill USD/year, not including added value provided by having a tocopherol concentration higher than the minimum, i.e. 8% to 10% required.

Example 3 Comparative

Background art for example 3 is a combination of the 2-condensation zone example described in U.S. Pat. No. 6,750,359 and part of U.S. Pat. No. 8,227,631, the part showing a high temperature condensation zone withholding predominantly low vapor pressure compounds ("neutral oil").

The process in FIG. 2 and FIG. 4 were simulated and their mass balances were compared. From Table 3 it can be noted that the composition of the enriched tocopherol product the content of neutral oil, defined here as TAG+DAG+MAG is rather high. By applying the same principle as used for the high temperature condensation stage, only using a higher condensation temperature, it becomes possible to take out most of the lowest vapour pressure compounds, i.e. the TAG and DAG, components, as shown the in flow charts of FIGS. 3 and 4. In order not to loose valuable tocopherol doing this, and furthermore to recover the neutral oils, the condensate from such a condensation stage is sent back, directly or indirectly, to the stripping column. The mass balance according to the invention at 140° C. in the high temperature condensation stage for a total mass balance 0.014 kg/hr is summarized in Table 3.

TABLE 3

| Stream Name | Oil in | Steam | Inleak. Air | To vacuum | Hot Dist. | Cold Dist. | After Strip. |
|---|---|---|---|---|---|---|---|
| Flow [kg/hr] | 50000.0 | 510.0 | 10.0 | 526.1 | 86.4 | 506.7 | 49400.7 |
| TAG | 97.1775 | — | — | — | 15.8052 | — | 98.3287 |
| DAG | 1.0000 | — | — | — | 19.0070 | 0.0006 | 0.9789 |
| MAG | 0.0500 | — | — | 0.0001 | 12.5804 | 1.4666 | 0.0135 |
| FFA | 1.0000 | — | — | 0.0313 | 0.1507 | 98.2789 | 0.0034 |
| Tocopherols | 0.1200 | — | — | — | 21.4387 | 0.0130 | 0.0838 |
| Sterols | 0.6000 | — | — | — | 30.0556 | 0.0572 | 0.5541 |
| Squalene | 0.0025 | — | — | — | 0.9622 | 0.0057 | 0.0008 |
| Water | 0.0500 | 100.00 | — | 98.0679 | 0.0003 | 0.1779 | 0.0367 |
| Air | — | — | 100.00 | 1.9007 | — | — | — |
| Σ | 100.00 | 100.00 | 100.00 | 100.00 | 100.00 | 100.00 | 100.00 |

The resulting mass balances for the processes according to prior art and to the invention with a recovery stage of neutral oil at operating temperature of 200° C. are summerized in Tables 4 and 5. Table 4 is the mass balance for the prior art process with neutral oil recovery having a mass balance deviation of 0.036 kg/hr.

TABLE 4

| | Stream Number | | | | | | |
|---|---|---|---|---|---|---|---|
| | 1 | 2 | 3 | 4 | 5 | 6 | 7 |
| | | | | | Low | High | |
| | Pretreat. | | Inleak. | Non- | Temp. | Temp. | After |
| Stream Name | Oil | Steam | Air | condens. | Dist. | Dist. | Strip. |
| Flow [kg/hr] | 50000.0 | 500.0 | 10.0 | 516.5 | 317.2 | 253.1 | 49423.2 |
| TAG | 97.1775 | — | — | — | — | 0.0349 | 98.3114 |
| DAG | 1.0000 | — | — | — | 0.0005 | 3.1822 | 0.9952 |
| MAG | 0.0500 | — | — | — | 0.8082 | 6.3626 | 0.0127 |
| FFA | 1.0000 | — | — | 0.0313 | 98.8700 | 73.0608 | 0.0032 |
| Tocopherols | 0.1200 | — | — | — | 0.0237 | 7.2763 | 0.0838 |
| Sterols | 0.6000 | — | — | — | 0.1051 | 9.7300 | 0.5563 |
| Squalene | 0.0025 | — | — | — | 0.0053 | 0.3441 | 0.0007 |
| Water | 0.0500 | 100.00 | — | 98.0323 | 0.1871 | 0.0091 | 0.0366 |
| Air | — | — | 100.00 | 1.9363 | — | — | — |
| Σ | 100.00 | 100.00 | 100.00 | 100.00 | 100.00 | 100.00 | 100.00 |

Table 5 is the mass balance for the invention process with neutral oil recovery having a mass balance deviation of 0.048 kg/hr.

TABLE 5

| | Stream Number | | | | | | |
|---|---|---|---|---|---|---|---|
| | 1 | 2 | 3 | 4 | 5 | 6 | 7 |
| | | | | | Low | High | |
| | Pretreat. | | Inleak. | Non- | Temp. | Temp. | After |
| Stream Name | Oil | Steam | Air | condens. | Dist. | Dist. | Strip. |
| Flow [kg/hr] | 50000.0 | 510.0 | 10.0 | 526.2 | 510.1 | 60.5 | 49423.2 |
| TAG | 97.1775 | — | — | — | — | 0.1445 | 98.3114 |
| DAG | 1.0000 | — | — | — | 0.0003 | 13.3590 | 0.9952 |
| MAG | 0.0500 | — | — | 0.0001 | 2.0334 | 13.4697 | 0.0127 |
| FFA | 1.0000 | — | — | 0.0312 | 97.7071 | 0.1218 | 0.0032 |
| Tocopherols | 0.1200 | — | — | — | 0.0145 | 30.5953 | 0.0838 |
| Sterols | 0.6000 | — | — | — | 0.0567 | 40.9231 | 0.5563 |
| Squalene | 0.0025 | — | — | — | 0.0099 | 1.3863 | 0.0007 |
| Water | 0.0500 | 100.00 | — | 98.0682 | 0.1781 | 0.0003 | 0.0366 |
| Air | — | — | 100.00 | 1.9005 | — | — | — |
| Σ | 100.00 | 100.00 | 100.00 | 100.00 | 100.00 | 100.00 | 100.00 |

The tables show the almost quantitative removal of TAG and a considerable reduction in the DAG content from the enriched tocopherol stream 6. However, for the prior art process the neutral oil reduction is not sufficient to bring the tocopherol concentration above the minimum 8% to 10% concentration. In contrast, for the invention the tocopherol concentration increases significantly to 21.4 to 30.6%.

The drawback from having such a neutral oil recovery stage is added pressure drop through the column, which, together with recycling tocopherol with the captured neutral oil, forces an increase in stripping temperature from 260 to 262.9° C. to achieve the same removal of tocopherol from the pretreated oil. However, in cases where a very high tocopherol concentration is valued, and the higher severity stripping conditions for the pretreated oil is not posing problems for the deodorization this should represent a very interesting processing option.

The invention claimed is:

1. A process comprising:
   (i) feeding a pre-treated oil feed stream to a vacuum steam stripping section, stripping off volatile phases;
   (ii) feeding the stripped off the volatile phases to a first condensation stage or to a combination of a first condensation stage and a second condensation stage, obtaining a condensed phase and a vapour phase, transferring the condensed phase to a vacuum distillation operation and transferring the vapour phase to a third condensation stage, wherein the first condensation stage has a higher temperature than the second condensation stage and wherein the second condensation stage has a higher temperature than the third condensation stage;
   (iii) subjecting the condensed phase to said vacuum distillation operation, and obtaining a first distillate and a stream of volatiles;
   (iv) feeding the vapour phase from the first condensation stage or the vapour phase from the combination of a first condensation stage and the second condensation stage, along with the stream of volatiles from the vacuum distillation operation to the third condensation stage, obtaining a stream of non-condensable gases and a second distillate, feeding the stream of non-condensable gases to a vacuum system; and
   (v) recovering from the vacuum steam stripping section a stream of refined oils.

2. The process according to claim 1, wherein the process further comprises adding a side stream of the second distillate to the vacuum distillation operation.

3. The process according to claim 1, wherein the process further comprises assisting the vacuum distillation operation with a stripping steam.

4. The process according to claim 1, wherein (ii) is carried out in the combination of the first condensation stage and the second condensation stage, and that the process also comprises retaining and sending all or some portion of a condensed oils from the first condensation stage along with the pre-treated oil feed stream directly to the feed point of the vacuum steam stripping section or indirectly via a pre-treatment step.

5. The process according to claim 4, wherein the process further comprises feeding the stripped off volatile phases from the vacuum steam stripping section to the first condensation stage and then to the second condensation stage, and that the process further comprises that the condensed phase and the vapour phase are obtained in the second condensation stage, sending the condensed phase to the vacuum distillation stage for vacuum distillation operation, and sending the vapour phase to the third condensation stage, obtaining in the vacuum distillation stage stream of volatiles, which stream of volatiles is transferred along with the vapour phase to the third condensation stage.

6. The process according to claim 1, wherein the stripped off volatile phases from the vacuum steam stripping section are first fed to the first condensation stage, obtaining the condensed phase and the vapour phase, sending the condensed phase to the vacuum distillation stage for vacuum distillation operation, and sending the vapour phase to the third condensation stage, obtaining in the vacuum distillation stage stream of volatiles, which stream of volatiles is transferred along with vapour phase to the third condensation stage.

7. The process according to claim 1, wherein the process further comprises subjecting the condensed phase to the vacuum distillation stage for vacuum distillation operation along with a side stream of the second distillate, assisting the distillation with stripping steam and obtaining the first distillate and the stream of volatiles, which stream of volatiles is transferred along with the vapour phase to the third condensation stage.

8. The process according to claim 1, wherein the stream of volatiles along with the vapour phase are transferred to the third condensation stage obtaining a stream of non-condensable gases, which stream of non-condensable gases is sent to the vacuum system, and the second distillate, wherein the second distillate is a fatty acid product stream.

9. The process according to claim 1, wherein the first distillate is a stream enriched in micronutrients, and the stream of refined oil comprises tri-, di- and mono-acylglycerides.

10. The process according to claim 9, wherein the first distillate comprises tocopherols, sterols, and squalene.

11. The process according to claim 1, wherein the vacuum steam stripping section in (i) is operating at a pressure within a range from 1 to 10 mbar.

12. The process according to claim 11, wherein the vacuum steam stripping section in (i) is operating at a pressure within the range from 1.5 to 5 mbar.

13. The process according to claim 1, wherein a temperature in the first condensation stage is within a range from 130 to 220° C.

14. The process according to claim 13, wherein the temperature in the first condensation stage is within the range from 130 to 170° C.

15. The process according to claim 13, wherein the temperature in the first condensation stage is within the range from 140 to 150° C.

16. The process according to claim 1, wherein the vacuum distillation operation is working according to counter-current principle which comprises a stripping section and a rectification section and operates at a vacuum level within a range 1 to 5 mbar, and a temperature within a range 240 to 260° C.

17. The process according to claim 1, wherein a temperature in the second condensation stage is within a range 130 to 170° C.

18. The process according to claim 17, wherein the temperature in the second condensation stage is within the range 140 to 150° C.

19. The process according to claim 1, wherein (i) comprises feeding an oily feed stream comprising volatiles, micronutrients and neutral oils, to the vacuum steam stripping section, and (i) further comprises stripping off fatty acids together with other volatiles, and neutral oils.

20. The process according to claim 19, wherein the volatiles comprise free fatty acids and the neutral oils comprise mixtures of tri-, di- and mono-acylglycerides.

21. The process according to claim 1, wherein a temperature in the first condensation stage is within a range from 130 to 220° C.; and wherein the vacuum distillation operation operates at a temperature within a range 240 to 260° C.

* * * * *